United States Patent
Li et al.

(10) Patent No.: US 12,432,185 B2
(45) Date of Patent: Sep. 30, 2025

(54) SECURE COMMUNICATIONS METHOD AND APPARATUS

(71) Applicant: Shenzhen Yinwang Intelligent Technologies Co., Ltd., Shenzhen (CN)

(72) Inventors: Yong Li, Darmstadt (DE); Feng Geng, Suzhou (CN); Li Duan, Darmstadt (DE); Pingping Yi, Beijing (CN); Min Li, Nanjing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 17/840,806

(22) Filed: Jun. 15, 2022

(65) Prior Publication Data

US 2022/0311751 A1    Sep. 29, 2022

Related U.S. Application Data

(63) Continuation of application No. PCT/CN2020/125492, filed on Oct. 30, 2020.

(51) Int. Cl.
   *H04L 9/40* (2022.01)
   *H04L 9/08* (2006.01)
   *H04L 9/30* (2006.01)

(52) U.S. Cl.
   CPC .......... *H04L 63/0428* (2013.01); *H04L 9/085* (2013.01); *H04L 9/0861* (2013.01); *H04L 9/30* (2013.01)

(58) Field of Classification Search
   CPC ... H04L 63/0428; H04L 9/085; H04L 9/0861; H04L 9/30
   See application file for complete search history.

(56) References Cited

U.S. PATENT DOCUMENTS

| | | | |
|---|---|---|---|
| 7,694,141 B2 * | 4/2010 | Lauter | H04L 9/3247 713/176 |
| 2002/0136410 A1 * | 9/2002 | Hanna | H04L 9/088 380/277 |

(Continued)

FOREIGN PATENT DOCUMENTS

| | | |
|---|---|---|
| CN | 101299667 A | 11/2008 |
| CN | 102624528 A | 8/2012 |

(Continued)

OTHER PUBLICATIONS

Olaf Pfeiffer, "Implementing Scalable CAN Security with CANcrypt, Authentication and encryption for the Controller Area Network and CANopen," by Embedded Systems Academy GMBH, 2017, 40 pages.

(Continued)

*Primary Examiner* — Hieu T Hoang
(74) *Attorney, Agent, or Firm* — Conley Rose, P.C.

(57) ABSTRACT

A secure communications method includes: receiving, by a first network device, a second ephemeral public key of a second network device; determining, by the first network device, an ephemeral session key based on a first shared key, a first ephemeral secret key of the first network device, and the second ephemeral public key, where the first shared key is shared between the first network device and the second network device; and performing, by the first network device, secure communication with the second network device based on the ephemeral session key.

20 Claims, 9 Drawing Sheets

(56) References Cited

U.S. PATENT DOCUMENTS

| | | | | |
|---|---|---|---|---|
| 2006/0093138 | A1* | 5/2006 | Durand | H04L 9/0844 380/44 |
| 2010/0023771 | A1* | 1/2010 | Struik | H04L 9/3252 713/171 |
| 2011/0208970 | A1* | 8/2011 | Brown | H04L 9/3066 713/176 |
| 2012/0082312 | A1* | 4/2012 | Liu | H04L 9/0863 380/262 |
| 2015/0052352 | A1* | 2/2015 | Dolev | H04L 9/3278 713/156 |
| 2015/0124961 | A1* | 5/2015 | Lambert | H04L 9/14 380/44 |
| 2015/0319149 | A1 | 11/2015 | Alshammari | |
| 2015/0372811 | A1* | 12/2015 | Le Saint | H04L 63/068 705/76 |
| 2016/0006729 | A1 | 1/2016 | Yang et al. | |
| 2016/0065370 | A1* | 3/2016 | Le Saint | H04L 9/0891 713/155 |
| 2017/0034168 | A1* | 2/2017 | Wilson | H04L 63/0807 |
| 2018/0063094 | A1* | 3/2018 | Albrecht | H04L 9/0833 |
| 2018/0375663 | A1 | 12/2018 | Le Saint et al. | |
| 2019/0020632 | A1* | 1/2019 | Leavy | H04L 9/14 |
| 2019/0245681 | A1* | 8/2019 | Alwen | H04L 9/085 |
| 2019/0371104 | A1 | 12/2019 | Suleiman et al. | |
| 2021/0028931 | A1* | 1/2021 | Ng | H04L 9/085 |
| 2021/0144004 | A1* | 5/2021 | Gray | H04L 9/3265 |
| 2022/0021530 | A1* | 1/2022 | Kupwade Patil | H04L 9/0825 |
| 2022/0311751 | A1* | 9/2022 | Li | H04L 12/40006 |

FOREIGN PATENT DOCUMENTS

| | | |
|---|---|---|
| CN | 102724211 A | 10/2012 |
| CN | 103825742 A | 5/2014 |
| CN | 106471768 A | 3/2017 |
| CN | 106790053 A | 5/2017 |
| CN | 107241190 A | 10/2017 |
| CN | 109033862 A | 12/2018 |
| CN | 109639412 A | 4/2019 |
| CN | 110601825 A | 12/2019 |
| CN | 110771089 A | 2/2020 |
| CN | 110912686 A | 3/2020 |
| CN | 111181928 A | 5/2020 |
| CN | 111314274 A | 6/2020 |
| WO | 2019086444 A1 | 5/2019 |
| WO | 2022032548 A1 | 2/2022 |

OTHER PUBLICATIONS

"Specification of Time Synchronization over CAN," AUTOSAR Release 4.2.2, 2015, 64 pages.

Giampaolo Bella et al., "TOUCAN, A proTocol tO secUre Controller Area Network," Nov. 23, 2021, 6 pages.

Song Ju, "A Lightweight Key Establishment in Wireless Sensor Network Based on Elliptic Curve Cryptography," 2012, 4 pages.

Daniel Zelle et al., "On Using TLS to Secure In-Vehicle Networks," Aug. 29-Sep. 1, 2017, 10 pages.

Guo Song-hui et al., "Elliptic Curve Based Light-weight Authentication and Key Agreement Scheme," Computer Science, vol. 42, No. 1, Jan. 2015, with an English abstract, 5 pages.

Shweta Arora et al.,"Secure Session Key Sharing Using Symmetric Key Cryptography," International Conference on Advances in Computing, Communications and Informatics (ICACCI), 2018, 6 pages.

* cited by examiner

SECURE COMMUNICATIONS METHOD AND APPARATUS

CROSS-REFERENCE TO RELATED APPLICATIONS

This is a continuation of International Patent Application No. PCT/CN2020/125492 filed on Oct. 30, 2020, which is hereby incorporated by reference in its entirety.

TECHNICAL FIELD

This disclosure relates to the field of communication technologies, and in particular, to a secure communications method and apparatus.

BACKGROUND

Data transmission in a vehicle through a bus mainly involves data transmission on a low-speed bus, data transmission on a high-speed bus, and transmission of data from the low-speed bus to the high-speed bus. The low-speed bus is usually a Controller Area Network (CAN) bus. The high-speed bus is usually an Ethernet bus, a CAN with Flexible Data-Rate (CAN-FD) bus, or a third-generation CAN-Extra Long (CAN-XL) bus.

Data on a CAN bus is usually not encrypted for transmission, and if the data on the CAN bus needs to be encrypted for transmission, a long-term shared key preconfigured by an electronic component on the CAN bus is used. Such an encryption manner has a relatively high risk of key leakage, and consequently transmission of data from the low-speed bus to the high-speed bus is affected. It can be learned that security of existing in-vehicle bus communication is relatively poor.

SUMMARY

Embodiments of this disclosure provide a secure communications method and apparatus, and may be applied to fields such as vehicle-to-everything (V2X), intelligent networked vehicles, assisted driving, and intelligent driving, so as to improve security of in-vehicle bus communication by negotiating an ephemeral session key.

According to a first aspect, an embodiment of this disclosure provides a secure communications method, applied to a first network device. The method includes receiving a second ephemeral public key of a second network device, determining an ephemeral session key based on a first shared key, a first ephemeral secret key of the first network device, and the second ephemeral public key, where the first shared key is a key shared between the first network device and the second network device, and performing secure communication with the second network device based on the ephemeral session key. The communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the first network device/second network device may be a network element (or an electronic component) that communicates inside a vehicle by using a bus. The bus may be a CAN bus, a CAN-FD bus, a CAN-XL bus, an Ethernet bus, a bus applied in the vehicle in the future, or the like.

In an optional implementation, the method further includes obtaining a first ephemeral public key through derivation based on a public key cryptographic algorithm and the first ephemeral secret key, where a same public key cryptographic algorithm is configured in the first network device and the second network device, and sending a first message to the second network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the first network device may determine the first verification information based on the first ephemeral public key and the first shared key.

In an optional implementation, the first identification information includes a first timestamp, a first count, or a first random number.

In an optional implementation, receiving a second ephemeral public key of a second network device includes receiving a second message from the second network device, where the second message carries the second ephemeral public key.

In an optional implementation, the second message further carries second verification information used to verify whether the second message is complete and/or second identification information used to indicate that the second network device has sent the second message. When the second ephemeral public key is transferred through the second message, application layer session authentication of the second network device on the first network device may be completed.

In an optional implementation, the second identification information includes a second timestamp, a second count, or a second random number.

In an optional implementation, determining an ephemeral session key based on a first shared key, a first ephemeral secret key of the first network device, and the second ephemeral public key includes encrypting, by using a preset key derivation function, the first shared key, the first ephemeral secret key, the information carried in the first message, and the information carried in the second message, to generate the ephemeral session key, where a same key derivation function is configured in the first network device and the second network device.

According to a second aspect, an embodiment of this disclosure provides a secure communications method, applied to a second network device. The method includes receiving a first ephemeral public key of a first network device, determining an ephemeral session key based on a first shared key, a second ephemeral secret key of the second network device, and the first ephemeral public key, where the first shared key is a key shared between the first network device and the second network device, and performing secure communication with the first network device based on the ephemeral session key. The communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the first network device/second network device may be a network element (or an electronic component) that communicates inside a vehicle by using a bus. The bus may be a CAN bus, a CAN-FD bus, a CAN-XL bus, an Ethernet bus, a bus applied in the vehicle in the future, or the like.

In an optional implementation, receiving a first ephemeral public key of a first network device includes receiving a first message from the first network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the first identification information includes a first timestamp, a first count, or a first random number.

In an optional implementation, the method further includes obtaining a second ephemeral public key through derivation based on a public key cryptographic algorithm and the second ephemeral secret key, where a same public key cryptographic algorithm is configured in the first network device and the second network device, and sending a second message to the first network device, where the second message carries the second ephemeral public key.

In an optional implementation, the second message further carries second verification information used to verify whether the second message is complete and/or second identification information used to indicate that the second message has been sent. When the second ephemeral public key is transferred through the second message, application layer session authentication of the second network device on the first network device may be completed.

In an optional implementation, the method further includes determining the second verification information based on the second ephemeral public key and the first shared key.

In an optional implementation, the second identification information includes a second timestamp, a second count, or a second random number.

In an optional implementation, determining an ephemeral session key based on a first shared key, a second ephemeral secret key of the second network device, and the first ephemeral public key includes encrypting, by using a preset key derivation function, the first shared key, the second ephemeral secret key, the information carried in the first message, and the information carried in the second message, to generate the ephemeral session key, where a same key derivation function is configured in the first network device and the second network device.

According to a third aspect, an embodiment of this disclosure provides a secure communications apparatus, applied to a first network device. The apparatus includes a communications module configured to receive a second ephemeral public key of a second network device, and a processing module configured to determine an ephemeral session key based on a first shared key, a first ephemeral secret key of the first network device, and the second ephemeral public key, where the first shared key is a key shared between the first network device and the second network device, and the communications module is further configured to perform secure communication with the second network device based on the ephemeral session key.

In this embodiment of this disclosure, the communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the processing module is further configured to obtain a first ephemeral public key through derivation based on a public key cryptographic algorithm and the first ephemeral secret key, where a same public key cryptographic algorithm is configured in the first network device and the second network device, and the communications module is further configured to send a first message to the second network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the processing module is further configured to determine the first verification information based on the first ephemeral public key and the first shared key.

In an optional implementation, the first identification information includes a first timestamp, a first count, or a first random number.

In an optional implementation, the communications module is further configured to receive a second message from the second network device, where the second message carries the second ephemeral public key.

In an optional implementation, the second message further carries second verification information used to verify whether the second message is complete and/or second identification information used to indicate that the second network device has sent the second message. When the second ephemeral public key is transferred through the second message, application layer session authentication of the second network device on the first network device may be completed.

In an optional implementation, the second identification information includes a second timestamp, a second count, or a second random number.

In an optional implementation, the processing module is further configured to encrypt, by using a preset key derivation function, the first shared key, the first ephemeral secret key, the information carried in the first message, and the information carried in the second message, to generate the ephemeral session key, where a same key derivation function is configured in the first network device and the second network device.

According to a fourth aspect, an embodiment of this disclosure provides a secure communications apparatus, applied to a second network device. The apparatus includes a communications module configured to receive a first ephemeral public key of a first network device, and a processing module configured to determine an ephemeral session key based on a first shared key, a second ephemeral secret key of the second network device, and the first ephemeral public key, where the first shared key is a key shared between the first network device and the second network device, and the communications module is further configured to perform secure communication with the first network device based on the ephemeral session key.

In this embodiment of this disclosure, the communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the communications module is further configured to receive a first message from the first network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the first identification information includes a first timestamp, a first count, or a first random number.

In an optional implementation, the processing module is further configured to obtain a second ephemeral public key through derivation based on a public key cryptographic algorithm and the second ephemeral secret key, where a same public key cryptographic algorithm is configured in the first network device and the second network device, and the communications module is further configured to send a second message to the first network device, where the second message carries the second ephemeral public key.

In an optional implementation, the second message further carries second verification information used to verify whether the second message is complete and/or second identification information used to indicate that the second message has been sent. When the second ephemeral public key is transferred through the second message, application layer session authentication of the second network device on the first network device may be completed.

In an optional implementation, the processing module is configured to determine the second verification information based on the second ephemeral public key and the first shared key.

In an optional implementation, the second identification information includes a second timestamp, a second count, or a second random number.

In an optional implementation, the processing module is further configured to encrypt, by using a preset key derivation function, the first shared key, the second ephemeral secret key, the information carried in the first message, and the information carried in the second message, to generate the ephemeral session key, where a same key derivation function is configured in the first network device and the second network device.

According to a fifth aspect, an embodiment of this disclosure provides a communications apparatus, including a processor and a memory.

The memory is configured to store a computer program.

The processor is configured to execute the computer program stored in the memory, so that the method in any optional implementation of the first aspect to the fourth aspect is performed.

According to a sixth aspect, a communications apparatus is provided, including a processor and an interface circuit.

The interface circuit is configured to receive code instructions and transmit the code instructions to the processor.

The processor is configured to run the code instructions, so that the method in any optional implementation of the first aspect to the second aspect is performed.

According to a seventh aspect, a computer-readable storage medium is provided. The computer-readable storage medium stores instructions, and when the instructions are executed, the method in any optional implementation of the first aspect to the second aspect is performed.

According to an eighth aspect, an embodiment of this disclosure provides a computer program product. The computer program product includes computer program code, and when the computer program code is run, the method in any optional implementation of the first aspect to the second aspect is performed.

For technical effects that can be achieved in the fifth aspect to the eighth aspect, refer to descriptions of technical effects that can be brought by the corresponding technical solutions in the first aspect to the second aspect. Details are not described herein again.

DESCRIPTION OF EMBODIMENTS

Embodiments of this disclosure are applicable to fields such as V2X, intelligent networked vehicles, assisted driving, and intelligent driving.

The following further describes in detail this disclosure with reference to the accompanying drawings.

In the following, some terms in this disclosure are described, to help a person skilled in the art have a better understanding.

The term "and/or" in the embodiments of this disclosure describes only an association relationship between associated objects and represents that three relationships may exist. For example, A and/or B may represent the following three cases: only A exists, both A and B exist, and only B exists. The character "/" generally indicates an "or" relationship between the associated objects. "A Plurality of" means two or more than two. In addition, it should be understood that, in the descriptions of the embodiments of this disclosure, terms such as "first" and "second" are merely intended for a purpose of differentiated description, and should not be construed as an indication or an implication of relative importance, or an indication or an implication of a sequence.

A network device (for example, a first network device or a second network device) in the embodiments of this disclosure is a device that can communicate with another device, for example, perform signaling interaction. The network device in the embodiment of this disclosure includes network elements that communicate inside a vehicle by using a bus, for example, electronic components inside the vehicle such as a sensor, a camera, a multi domain controller (MDC), a telematics box (T-Box), an intelligent cockpit domain controller (CDC), an in-vehicle gateway, a vehicle control unit (VCU), a battery management system (BMS) controller, a thermal management system (TMS), and a power distribution unit. However, it should be noted that the network device in the embodiments of this disclosure is not limited to the network element inside the vehicle. The network device in the embodiments of this disclosure may alternatively be a base station device. The base station device may also be referred to as an access network device or an access node (AN). The access node may be further an evolved NodeB (eNB or eNodeB) in a Long-Term Evolution (LTE) system or a base station device (gNB), a small cell device, a wireless access node (Wi-Fi AP), or the like in a fifth generation (5G) network. This is not limited in the embodiments of this disclosure.

Figure 1A:
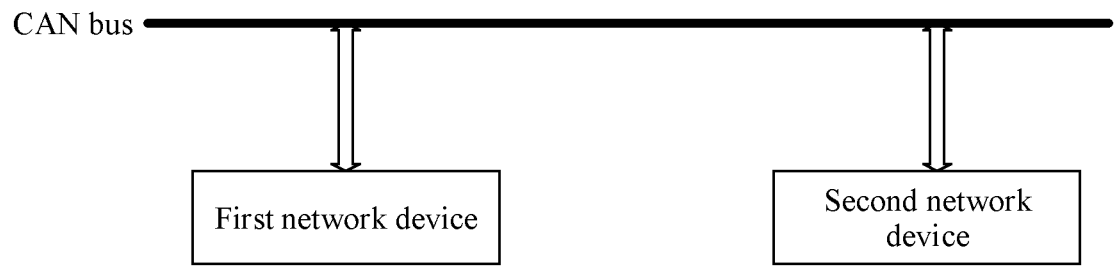
FIG. 1A is a schematic architectural diagram of a communications system according to an embodiment of this disclosure.
Figure 1B:
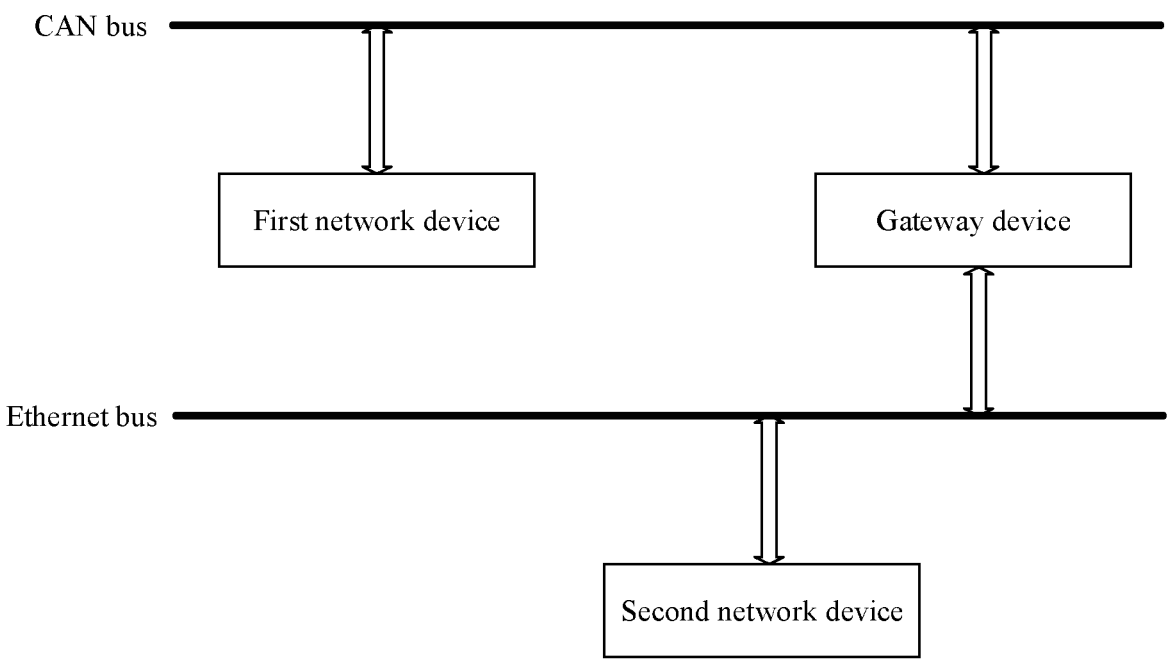
FIG. 1B is a schematic architectural diagram of another communications system according to an embodiment of this disclosure.

In an optional implementation, the first network device and the second network device in this embodiment of this disclosure may be network elements that are connected to a same bus inside the vehicle. For example, FIG. 1A shows a communications system. The system includes a first network device and a second network device that are connected to a CAN bus, and data is transmitted between the first network device and the second network device through the CAN bus. In another optional implementation, the first network device and the second network device in this embodiment of this disclosure may be network elements that are connected to different buses inside the vehicle, and cross-domain communication needs to be performed between the first network device and the second network device. For example, FIG. 1B shows another communications system. The system includes a first network device connected to a CAN bus, a second network device connected to an Ethernet bus, and a gateway device connected to the CAN bus and the Ethernet bus. When the first network device communicates with the second network device, data sent by the first network device needs to be transmitted to the gateway device through CAN bus communication, and then needs to be forwarded by the gateway device to the second network device through Ethernet bus communication.

Regardless of whether the first network device and the second network device are connected to a same bus or different buses, the first network device and the second network device may negotiate a security key for protecting the transmitted data before transmitting the data. The security key negotiated by the first network device and the second network device may have a specific validity period, and therefore, the security key may be referred to as an ephemeral session key. It is set that within a specific duration, secure communication may be performed between the first network device and the second network device through the foregoing ephemeral session key.

The following describes in detail a method for determining the ephemeral session key through negotiation between the first network device and the second network device.

Figure 2:
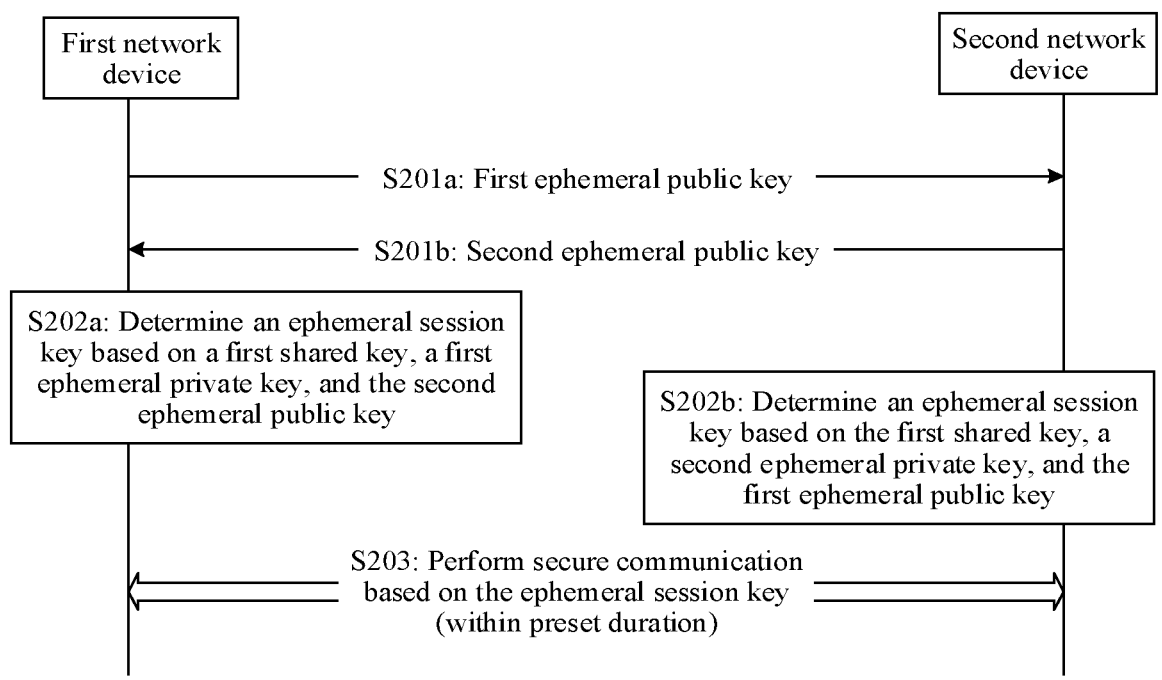
FIG. 2 is a schematic flowchart of a first secure communications method according to an embodiment of this disclosure.

As shown in FIG. 2, an embodiment of this disclosure provides a first secure communications method. The method may be applied to the communications system shown in FIG. 1A/FIG. 1B. The method includes the following steps.

S201$a$: A first network device sends a first ephemeral public key to a second network device.

Optionally, the first ephemeral public key may be determined in the following manner. The first network device randomly generates a key, for example, generates, through a random number generator, a random number sequence that can be used as the key, the first network device determines the key as a first ephemeral secret key, and the first network device obtains the first ephemeral public key through derivation based on a public key cryptographic algorithm and the first ephemeral secret key, where a same public key cryptographic algorithm is configured in the first network device and the second network device. Optionally, the public key cryptographic algorithm may be an elliptic curve cryptography (ECC) algorithm. The first ephemeral secret key is recorded as x, the first ephemeral public key is recorded as X, and X=x*G. G is a base point of a group of points on elliptic curve. "*" indicates an elliptic curve point multiplication algorithm. The first ephemeral secret key and the first ephemeral public key form a first ephemeral secret/public key share.

S201$b$: The second network device sends a second ephemeral public key to the first network device.

Optionally, the second ephemeral public key may be determined in the following manner. The second network device randomly generates a key, for example, generates, through the random number generator, a random number sequence that can be used as the key, the second network device determines the key as a second ephemeral secret key, and the second network device obtains the second ephemeral public key through derivation based on a public key cryptographic algorithm and the second ephemeral secret key, where a same public key cryptographic algorithm is configured in the first network device and the second network device. Optionally, the public key cryptographic algorithm may be an ECC algorithm. The second ephemeral secret key is recorded as y, the second ephemeral public key is recorded as Y, and Y=y*G. G is a base point of a group of points on elliptic curve. "*" indicates an elliptic curve point multiplication algorithm. The second ephemeral secret key and the second ephemeral public key form a second ephemeral secret/public key share.

Optionally, S201a and S201b may be performed in any sequence, and S201a and S201b may be performed at the same time. This is not limited in this embodiment of this disclosure.

S202a: The first network device determines an ephemeral session key based on a first shared key, the first ephemeral secret key, and the second ephemeral public key.

The first shared key is a key shared between two or more network devices. The foregoing two or more network devices include the first network device and the second network device. Optionally, the first shared key, or referred to as a first pre-shared key (PSK), is preconfigured in the first network device and the second network device.

Optionally, a same key derivation function may be configured in the first network device and the second network device. In this case, the first network device may obtain the ephemeral session key by performing derivation on the first shared key, the first ephemeral secret key, and the second ephemeral public key based on the key derivation function.

S202b: The second network device determines an ephemeral session key based on the first shared key, the second ephemeral secret key, and the first ephemeral public key.

The first shared key is a key shared between two or more network devices. The foregoing two or more network devices include the first network device and the second network device. Optionally, the first shared key, or referred to as a first PSK, is preconfigured in the first network device and the second network device.

Optionally, a same key derivation function may be configured in the first network device and the second network device. The second network device may obtain the ephemeral session key through performing derivation on the first shared key, the second ephemeral secret key, and the first ephemeral public key based on the key derivation function.

Optionally, S202a and S202b may be performed in any sequence, and S202a and S202b may be performed at the same time. This is not limited in this embodiment of this disclosure.

S203: The first network device and the second network device perform secure communication based on the ephemeral session key.

Optionally, valid duration of the ephemeral session key may be set, and is recorded as preset duration. Within the preset duration, the first network device and the second network device may perform secure communication for one or more times based on the ephemeral session key. After the preset duration expires, the first network device and the second network device need to renegotiate a new ephemeral session key in the manners of S201a to S202b. Then, in another period, that is, within preset duration, the first network device and the second network device may perform secure communication one or more times by using the new ephemeral session key.

In this embodiment of this disclosure, both communication parties interact their respective ephemeral public keys, and each party negotiates the ephemeral session key based on the pre-shared key, the ephemeral secret key of the party, and the ephemeral public key of the other party. It is set that the communication parties use the ephemeral session key to communicate within the valid duration of the ephemeral session key, so that communication security can be improved.

In a possible implementation, the first network device may send, to the second network device, a first message carrying the first ephemeral public key, where the first message further carries first verification information used to verify whether the first message is complete and/or first identification information used to indicate that the first network device has sent the first message. Similarly, the second network device may send, to the first network device, a second message carrying the second ephemeral public key, where the second message further carries second verification information used to verify whether the second message is complete and/or second identification information used to indicate that the second network device has sent the second message. The communication parties perform mutual identity authentication while transmitting their respective ephemeral public keys. For example, the first network device sends the first message to the second network device, and the second network device sends the second message to the first network device. Processes of application layer session authentication and security key agreement may be completed through interacting of the two messages. In this way, two-pass with explicit authentication is implemented.

Based on this, optionally, the first network device side may encrypt the first shared key, the first ephemeral secret key, the information carried in the first message, and the information carried in the second message by using the preset key derivation function, to generate the ephemeral session key. Similarly, the second network device side may encrypt the first shared key, the second ephemeral secret key, the information carried in the first message, and the information carried in the second message by using the preset key derivation function, to generate the ephemeral session key. Therefore, the ephemeral session key used for communication between the two parties is more difficult to be disclosed by an attack, and security of communication between the first network device and the second network device can be further improved.

The following further describes in detail processes in which the communication parties perform mutual authentication and generate the ephemeral session key with reference to examples 1 to 3.

Example 1

Figure 3:
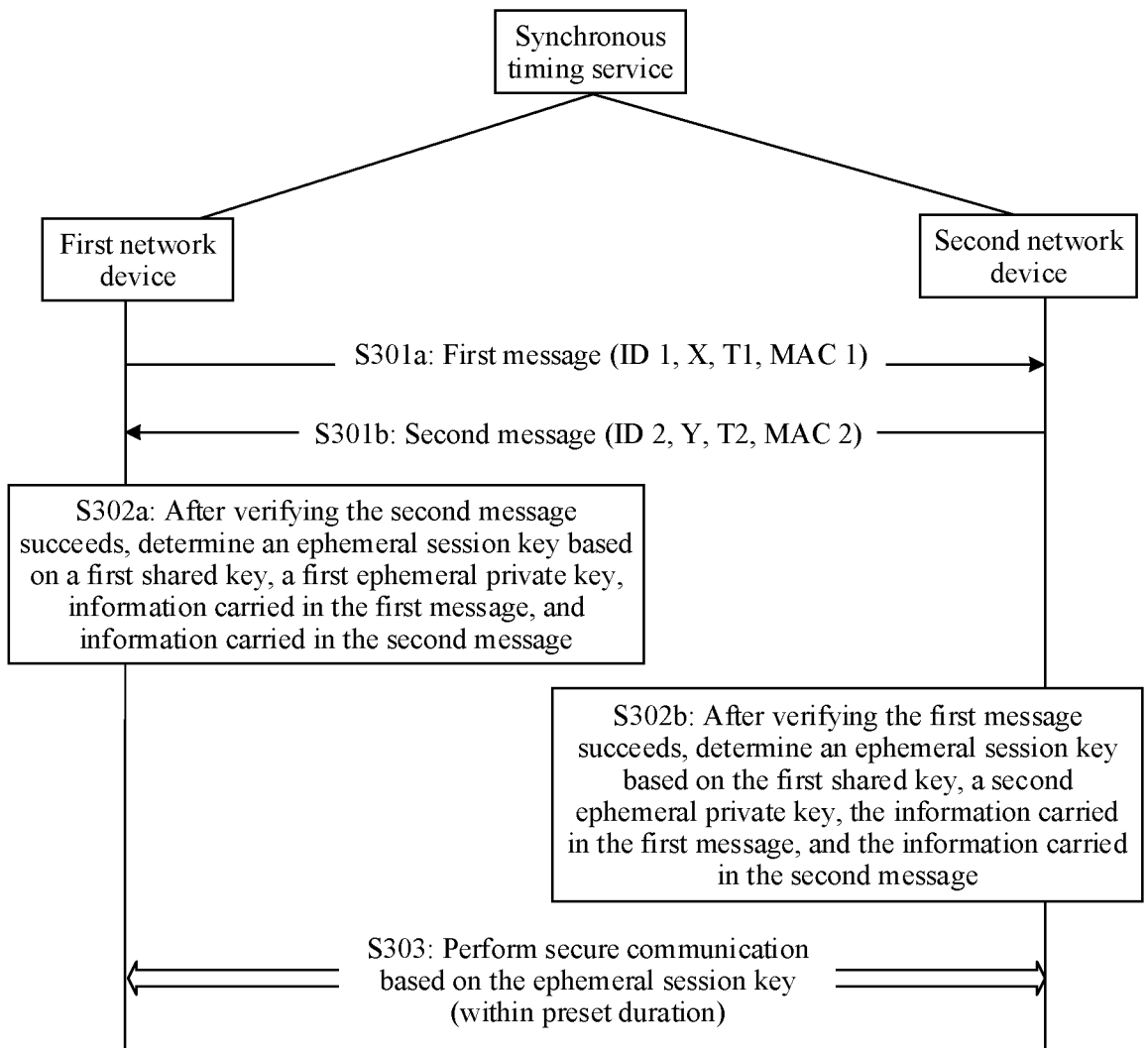
FIG. 3 is a schematic flowchart of a second secure communications method according to an embodiment of this disclosure.

As shown in FIG. 3, an embodiment of this disclosure provides a second secure communications method. The method may be applied to the communications system shown in FIG. 1A/FIG. 1B. The method includes the following steps.

S301a: A first network device sends a first message to a second network device, where the first message carries a first ephemeral public key (X), first verification information, and a first timestamp (T1).

The first timestamp (T1) is used to identify that the first network device has sent the first message, the first timestamp indicates a time at which the first network device sends the first message, and the first network device and the second network device perform synchronous timing service by using a same timing service clock. In an optional implementation, the same timing service clock may be preconfigured in the first network device and the second network device. In another optional implementation, a monotonic counter set by a SecOC module in an existing AUTomotive Open System ARchitecture (AUTOSAR) communications system may alternatively be used. Optionally, the monotonic counter can be realized by a freshness timestamp. Based on this, the monotonic counter may be used to perform synchronous timing service on the first network device and the second network device. When sending the first message to the second network device, the first network device may first obtain a freshness value (FV) based on the monotonic counter, and then add the freshness value to the first message as the first timestamp. In this way, freshness of the first message is ensured, and a message replay attack is avoided.

Optionally, as shown in FIG. 3, the first network device may further include, in the first message, an identity data (ID) used to identify the first network device, which is recorded as an ID 1, to explicitly indicate that the first message comes from the first network device.

Optionally, the first network device may determine the first verification information based on the first ephemeral public key and the first shared key. The first verification information is referred to as a message authentication code (MAC) of the first message. As shown in FIG. 3, the first verification information is recorded as a MAC 1. In an optional implementation, the MAC 1 may be determined in the following manner. First, the first network device derives the key MacKey 1 by using a keyed-hash MAC (HMAC) or HKDF algorithm, the pre-shared key PSK, and encryption context (ID 1||"ID 2"||X||"MacKey"). Further, MacKey 1=HKDF(PSK, ID 1||ID 2||X||"MacKey"). The HKDF algorithm is an HMAC-based key derivation algorithm (KDF), and the HMAC is a hash-based MAC. "||" indicates a concatenation symbol. "ID 1" is an ID of the first network device. When an ID of the second network device is pre-configured in the first network device, "ID 2" may be the ID of the second network device, or when the ID of the second network device is not configured in the first network device, "ID 2" may be a wildcard whose character length is the same as that of the foregoing ID. Optionally, a same wildcard is configured in the first network device and the second network device. X is the first ephemeral public key. "MacKey" is a character string used to identify a derived MacKey (which may be the MacKey 1 or a MacKey 2). "MacKey" may be a character string in which the first network device and the second network device negotiate a specific encoding rule in advance, or certainly may be replaced by another character string. This is not limited in this embodiment of this disclosure. Then, the first network device derives the first verification information MAC 1 by using a MAC algorithm, the foregoing MacKey 1 and encryption context (T1||X||ID 1||"ID 2"). MAC 1=MAC(MacKey 1, T1||X||ID 1||"ID 2"). T1 is the first timestamp. The MAC algorithm may be an HAMC algorithm, a cipher-based MAC (CMAC) algorithm, or the like. In another optional implementation, the MAC 1 may alternatively be determined according to a CMAC-AES algorithm set by the SecOC module in the existing AUTOSAR communications system, where "AES" refers to an advanced encryption standard algorithm.

S301b: The second network device sends a second message to the first network device, where the second message carries a second ephemeral public key (Y), second verification information, and a second timestamp (T2).

The second timestamp (T2) is used to identify that the second network device has sent the second message, the second timestamp indicates a time at which the second network device sends the second message, and the first network device and the second network device perform timing by using a same timing service clock. In an optional implementation, the same timing service clock may be preconfigured in the first network device and the second network device. In another optional implementation, a monotonic counter set by the SecOC module in the existing AUTOSAR communications system may also be used. Optionally, the monotonic counter can be realized by a freshness timestamp. Based on this, the monotonic counter may be used to perform synchronous timing service on the first network device and the second network device. When sending the second message to the first network device, the second network device may first obtain a freshness value (FV) based on the monotonic counter, and then add the freshness value to the second message as a second timestamp. In this way, freshness of the second message is ensured, and a message replay attack is avoided.

Optionally, as shown in FIG. 3, the second network device may further add, to the second message, an ID used to identify the second network device, which is recorded as an ID 2, to explicitly indicate that the second message comes from the second network device.

Optionally, the second network device may determine the second verification information based on the second ephemeral public key and the first shared key. The second verification information is referred to as a MAC of the second message. As shown in FIG. 3, the second verification information is recorded as a MAC 2. In an optional implementation, the MAC 2 may be determined in the following manner. First, the second network device derives the key MacKey 2 by using the HMAC algorithm, the HKDF algorithm, the pre-shared key PSK, and encryption context ("ID 1"||ID 2||Y||"MacKey"). Further, MacKey 2=HKDF (PSK, "ID 1"||ID 2||Y||"MacKey"). The HKDF algorithm is an HMAC-based KDF, and the HMAC is a hash-based MAC. "||" indicates a concatenation symbol. When the ID of the first network device is preconfigured in the second network device, "ID 1" may be the ID of the first network device, or when the ID of the first network device is not configured in the second network device, "ID 1" may be a wildcard whose character length is the same as that of the foregoing ID. Optionally, a same wildcard is configured in the first network device and the second network device. "ID 2" is an ID of the second network device. "Y" is the second ephemeral public key. "MacKey" is a character string used to identify a derived MacKey (which may be the MacKey 1 or the MacKey 2). "MacKey" may be a character string in which the first network device and the second network device negotiate a specific encoding rule in advance, or certainly may be replaced by another character string. This is not limited in this embodiment of this disclosure. Then, the second network device derives the second verification information MAC 2 by using the MAC algorithm, the foregoing MacKey 2, and encryption context (T2||Y||"ID 1"||ID 2). MAC 2=MAC(MacKey 2, T2||Y||"ID 1"||ID 2). T2 is the foregoing second timestamp. The MAC algorithm may be the HAMC algorithm, the CMAC algorithm, or the like. In another optional implementation, the second network device may alternatively determine the MAC 2 by using the CMAC-AES algorithm set by the SecOC module in the existing AUTOSAR communications system.

It should be noted that S301a and S302b may be performed at the same time without distinguishing an execution sequence. This is not limited in the embodiments of this disclosure.

After S301a and S301b, S302a and S302b are further performed.

S302a: The first network device verifies the second message, and determines an ephemeral session key based on the first shared key, a first ephemeral secret key, the information carried in the first message, and the information carried in the second message after the verification succeeds.

Optionally, that the first network device verifies the second message includes the following two steps A1 and A2. A1: The first network device determines whether a difference between the second timestamp carried in the second message and a current time is less than a preset time difference threshold. If whether the difference between the second timestamp carried in the second message and the current time is less than the preset time difference threshold, A2 is performed. If whether the difference between the second timestamp carried in the second message and the current time is not less than the preset time difference threshold, the first network device determines that the verification fails. A2: The first network device parses out the second ephemeral public key (Y) carried in the second message, and calculates MacKey 2=HKDF(PSK, "ID 1"||ID 2||Y||"MacKey") in the same manner as that of the second network device, and the first network device verifies, based on the MacKey 2 obtained through calculation, whether the MAC 2 carried in the second message is correct. If the MAC 2 carried in the second message is correct, the first network device determines that the verification succeeds. If the MAC 2 carried in the second message is not correct, the first network device determines that the verification fails.

Optionally, after successfully verifying the second message, the first network device may determine the ephemeral session key by using the following formulas. The ephemeral session key includes an encryption key (DataKey) used for transmitting data between the first network device and the second network device, and an authentication key (AuthKey) used by the first network device and the second network device to verify each other's identities.

DataKey=HKDF(masterKey,$W$||"DataKeyInfo").

AuthKey=HKDF(masterKey,$W$||"AuthenticationKey-Info").

W is used to represent the information carried in the first message and the second message. Further, W may be a hash value obtained by performing hash calculation on the information carried in the first message and the second message by using a hash (Hash) algorithm. For example, W=Hash (T1||T2||X||Y||ID 1||ID 2||MAC 1||MAC 2).

Herein, masterKey indicates an ephemeral master key, which is used as a base key for deriving the DataKey or AuthKey. Optionally, masterKey may be calculated by using the following formula: masterKey=HKDF(PSK|| x*Y, W). x*Y represents point multiplication calculation according to the foregoing elliptic curve encryption algorithm, and x*Y=x*y*G=y*x*G=y*X.

"DataKeyInfo" includes information necessary to support lifecycle management of the encryption key, and is bound to the encryption key DataKey. "AuthenticationKeyInfo" includes information necessary to support lifecycle management of the authentication key, and is bound to the authentication key AuthKey.

S302b: The second network device verifies the first message, and determines an ephemeral session key based on the first shared key, a second ephemeral secret key, the information carried in the first message, and the information carried in the second message after the verification succeeds.

Optionally, that the second network device verifies the first message includes the following two steps B1 and B2. B1: The second network device determines whether a difference between the first timestamp carried in the first message and the current time is less than the preset time difference threshold. If the difference between the first timestamp carried in the first message and the current time is less than the preset time difference threshold, B2 is performed. If the difference between the first timestamp carried in the first message and the current time is not less than the preset time difference threshold, the second network device determines that the verification fails. B2: The second network device parses out the first ephemeral public key (X) carried in the first message, and calculates MacKey 1=HKDF(PSK, ID 1||"ID 2"||X||"MacKey") in the same manner as that of the first network device, and the second network device verifies, based on the MacKey 1 obtained through calculation, whether the MAC 1 carried in the first message is correct. If the MAC 1 carried in the first message is correct, the second network device determines that the verification succeeds. If the MAC 1 carried in the first message is not correct, the second network device determines that the verification fails.

Optionally, after successfully verifying the first message, the second network device may determine the ephemeral session key by referring to the embodiment in S302a. Details are not described in this embodiment of this disclosure.

After S302a and S302b are performed, S303 is further performed: Perform secure communication between the first network device and the second network device based on the ephemeral session key within preset duration.

In this embodiment of this disclosure, both communication parties interact a fresh timestamp and a MAC while interacting an ephemeral public key randomly generated by each other, to complete identity authentication of each other. This feature prevents interaction messages from being subjected to a replay attack, an unknown key share attack, and a man-in-the-middle (MITM) attack. In this way, security of interaction messages, especially the ephemeral public keys, is improved. Further, the ephemeral session key that is available for communication between the communication parties within a specific period of time is determined based on the shared key preconfigured on the communication parties and the ephemeral public keys generated by the communication parties. In this way, a session key leak (revealKey attack) and an ephemeral key leak (revealephemeralkey attack) can be prevented, and forward security can be ensured. Even if the foregoing ephemeral session key is subsequently leaked, previous communication content cannot be obtained due to expiration of the time limit. Therefore, security of communication between the first network device and the second network device is greatly improved.

Example 2

Figure 4:
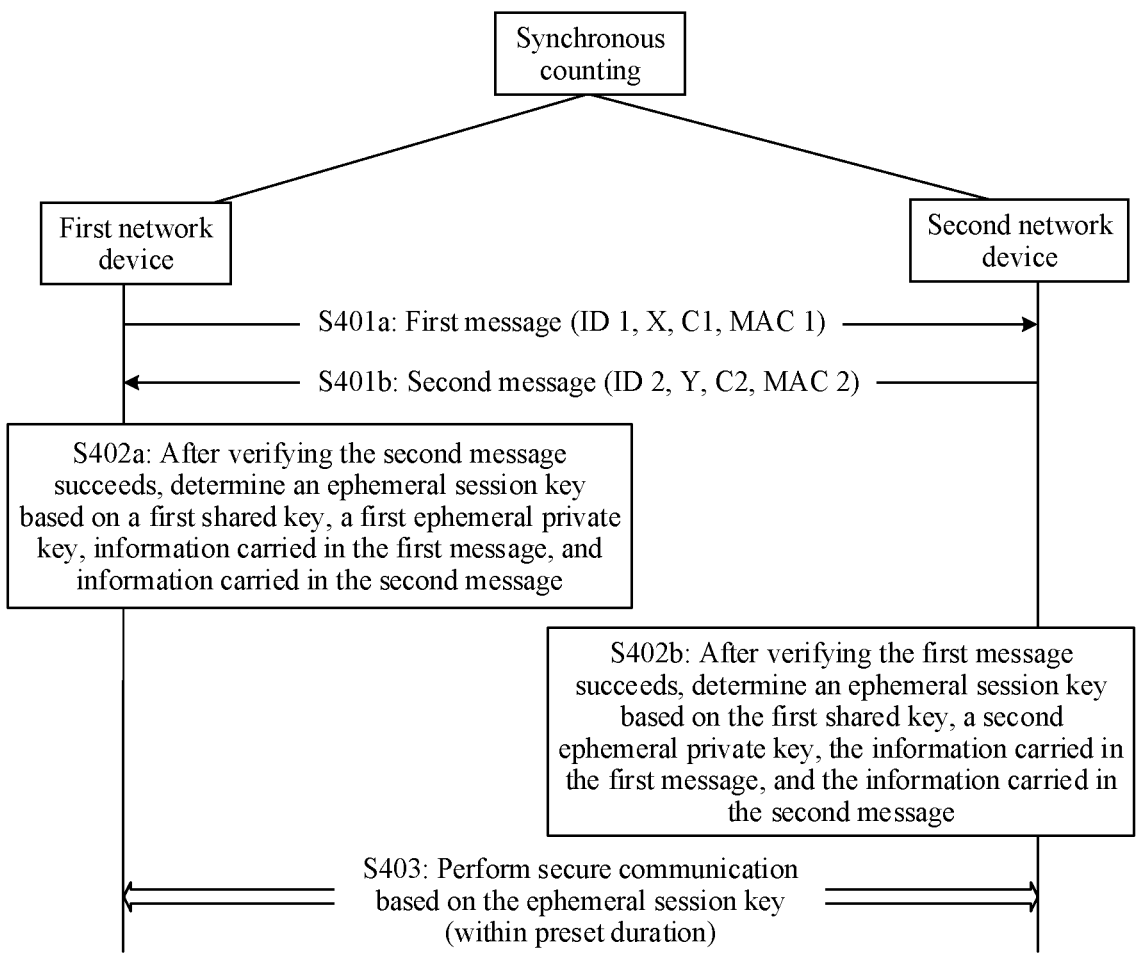
FIG. 4 is a schematic flowchart of a third secure communications method according to an embodiment of this disclosure.

As shown in FIG. 4, an embodiment of this disclosure provides a third secure communications method. The method may be applied to the communications system shown in FIG. 1A/FIG. 1B. The method includes the following steps.

S401a: A first network device sends a first message to a second network device, where the first message carries a first ephemeral public key (X), first verification information, and a first count (Counter 1, referred to as C1 in FIG. 4).

The first count (Counter 1) is used to identify that the first network device has sent the first message, and the first network device and the second network device update counts by using a same counter. In an optional implementation, a synchronization counter may be preconfigured in the first network device and the second network device. In another optional implementation, a monotonic counter set by the SecOC module in the existing AUTOSAR communications system may also be used. Optionally, the monotonic counter is implemented in a freshness counter. Based on this, the monotonic counter may be used to perform synchronous counting increment on the first network device and the second network device. When sending the first message to the second network device, the first network device may first obtain a freshness value (FV) based on the monotonic counter, and then add the freshness value to the first message as the first count. In this way, freshness of the first message is ensured, and a message replay attack is avoided.

Optionally, as shown in FIG. 4, the first network device may further add, to the first message, an ID used to identify the first network device, which is recorded as an ID 1, to explicitly indicate that the first message comes from the first network device.

Optionally, the first network device may determine the first verification information based on the first ephemeral public key and the first shared key. The first verification information is referred to as a MAC of the first message. As shown in FIG. 4, the first verification information is recorded as a MAC 1. In an optional implementation, the MAC 1 may be determined in the following manner. First, the first network device derives the key MacKey 1 by using an HMAC algorithm or HKDF algorithm, the first pre-shared key PSK, and encryption context (ID 1∥"ID 2"∥X∥"MacKey"). Further, the MacKey 1 may be determined with reference to the implementation in S301a. Details are not described again in the embodiment of this disclosure. Then, the first network device derives the first verification information MAC 1 by using the MAC algorithm, the foregoing MacKey 1, and encryption context (Counter 1∥X∥ID 1∥"ID 2"). MAC 1=MAC(MacKey 1, Counter 1∥X∥ID 1∥"ID 2"). The counter 1 is the first count. The MAC algorithm may be the HAMC algorithm, the CMAC algorithm, or the like. In another optional implementation, the MAC 1 may alternatively be determined by using a CMAC-AES algorithm set by the SecOC module in the existing AUTOSAR communications system.

S401b: The second network device sends a second message to the first network device, where the second message carries a second ephemeral public key (Y), second verification information, and a second count (Counter 2, referred to as C2 in FIG. 4).

The second count (Counter 2) is used to identify that the second network device has sent the second message, and the first network device and the second network device update counts by using the same counter. In an optional implementation, a synchronization counter may be preconfigured in the first network device and the second network device. In another optional implementation, a monotonic counter set by the SecOC module in the existing AUTOSAR communications system may also be used. Optionally, the monotonic counter is implemented in a freshness counter. Based on this, the monotonic counter may be used to perform synchronous counting increment on the first network device and the second network device. When sending the second message to the first network device, the second network device may first obtain a freshness value (FV) based on the monotonic counter, and then add the freshness value to the second message as a second count. In this way, freshness of the second message is ensured, and a message replay attack is avoided.

Optionally, as shown in FIG. 4, the second network device may further add, to the second message, an ID used to identify the second network device, which is recorded as the ID 2, to explicitly indicate that the second message comes from the second network device.

Optionally, the second network device may determine the second verification information based on the second ephemeral public key and the first shared key. The second verification information is referred to as a MAC of the second message. As shown in FIG. 4, the second verification information is recorded as a MAC 2. In an optional implementation, the MAC 2 may be determined in the following manner. First, the second network device derives a key MacKey 2 by using the HKDF algorithm, the first pre-shared key PSK, and encryption context ("ID 1"∥ID 2∥Y∥"MacKey"). Further, the MacKey 1 may be further determined with reference to the implementation in S301b. Details are not described again in the embodiment of this disclosure. Then, the second network device derives the second verification information MAC 2 by using the MAC algorithm, the foregoing MacKey 2, and encryption context (Counter 2∥Y∥"ID 1"∥ID 2). The MAC 2=MAC (MacKey 2, Counter 2∥Y∥"ID 1"∥ID 2). The counter 2 is the second count. The MAC algorithm may be the HAMC algorithm, a CMAC algorithm, or the like. In another optional implementation, the second network device may alternatively determine the MAC 2 by using the CMAC-AES algorithm set by the SecOC module in the existing AUTOSAR communications system.

It should be noted that S401a and S401b may be performed at the same time without distinguishing an execution sequence. This is not limited in the embodiments of this disclosure.

After S401a and S402b, S402a and S402b are further performed.

S402a: The first network device verifies the second message, and determines an ephemeral session key based on the first shared key, a first ephemeral secret key, the information carried in the first message, and the information carried in the second message after the verification succeeds.

Optionally, that the first network device verifies the second message includes the following two steps A1 and A2. A1: The first network device determines whether the second count carried in the second message is the same as a current count value of the counter. If the second count carried in the second message is the same as a current count value of the counter, A2 is performed. If the second count carried in the second message is different from a current count value of the counter, the first network device determines that the verification fails. A2: The first network device parses out the second ephemeral key (Y) carried in the second message, and calculates MacKey 2=HKDF(PSK, "ID 1"∥ID 2∥Y∥"MacKey") in the same manner as that of the second network device, and the first network device verifies, based on the MacKey 2 obtained through calculation, whether the MAC 2 carried in the second message is correct. If the MAC 2 carried in the second message is correct, the first network device determines that the verification succeeds. If the MAC 2 carried in the second message is not correct, the first network device determines that the verification fails.

Optionally, after successfully verifying the second message, the first network device may determine the ephemeral session key by using the following formulas. The ephemeral session key includes an encryption key (DataKey) used for transmitting data between the first network device and the second network device, and an authentication key (AuthKey) used by the first network device and the second network device to verify each other's identities.

DataKey=HKDF(masterKey, W∥"DataKeyInfo").

AuthKey=HKDF(masterKey, W∥"AuthenticationKeyInfo").

W is used to represent the information carried in the first message and the second message. Further, W may be a hash value obtained by performing hash calculation on the information carried in the first message and the second message by using a hash (Hash) algorithm. For example, W=Hash (Counter 1∥Counter 2∥X∥Y∥ID 1∥ID 2∥MAC 1∥MAC 2).

Herein, masterKey indicates an ephemeral master key, which is used as a base key for deriving the DataKey or AuthKey. Optionally, masterKey may be calculated by using the following formula: masterKey=HKDF(PSK x*Y, W). x*Y represents point multiplication calculation according to the foregoing elliptic curve encryption algorithm, and x*Y=x*y*G=y*x*G=y*X.

"DataKeyInfo" includes information necessary to support lifecycle management of the encryption key, and is bound to the encryption key DataKey. "AuthenticationKeyInfo" includes information necessary to support lifecycle management of the authentication key, and is bound to the authentication key AuthKey.

S402b: The second network device verifies the first message, and determines an ephemeral session key based on the first shared key, a second ephemeral secret key, the information carried in the first message, and the information carried in the second message after the verification succeeds.

Optionally, that the second network device verifies the first message includes the following two steps B1 and B2. B1: The second network device determines whether the first count carried in the first message is the same as the current count value of the counter. If the first count carried in the first message is the same as the current count value of the counter, B2 is performed. If the first count carried in the first message is different from the current count value of the counter, the second network device determines that the verification fails. B2: The second network device parses out the first ephemeral public key (X) carried in the first message, and calculates MacKey 1=HKDF(PSK, ID 1∥"ID 2"∥X∥"MacKey") in the same manner as that of the first network device, and the second network device verifies, based on the MacKey 1 obtained through calculation, whether the MAC 1 carried in the first message is correct. If the MAC 1 carried in the first message is correct, the second network device determines that the verification succeeds. If the MAC 1 carried in the first message is not correct, the second network device determines that the verification fails.

Optionally, after successfully verifying the second message, the first network device may determine the ephemeral session key by referring to the embodiment in S402a. Details are not described in the embodiment of this disclosure.

After S402a and S402b are performed, S403 is further performed: Perform secure communication between the first network device and the second network device based on the ephemeral session key within preset duration.

In the embodiment of this disclosure, both communication parties interact a fresh count value and a MAC while interacting an ephemeral public key randomly generated by each other, to complete identity authentication of each other. This feature prevents interaction messages from being subjected to replay attacks, unknown key sharing attacks, and MITM attacks. In this way, security of message interaction, especially ephemeral public key interaction, is improved. Further, the ephemeral session key that is available for communication between the communication parties within a specific period of time is determined based on the shared key preconfigured on the communication parties and the ephemeral public keys generated by the communication parties. In this way, a session key leak and an ephemeral key leak can be prevented, and forward security can be ensured. Even if the foregoing ephemeral session key is subsequently leaked, previous communication content cannot be obtained due to expiration of the time limit. Therefore, security of communication between the first network device and the second network device is greatly improved.

Example 3

Figure 5:
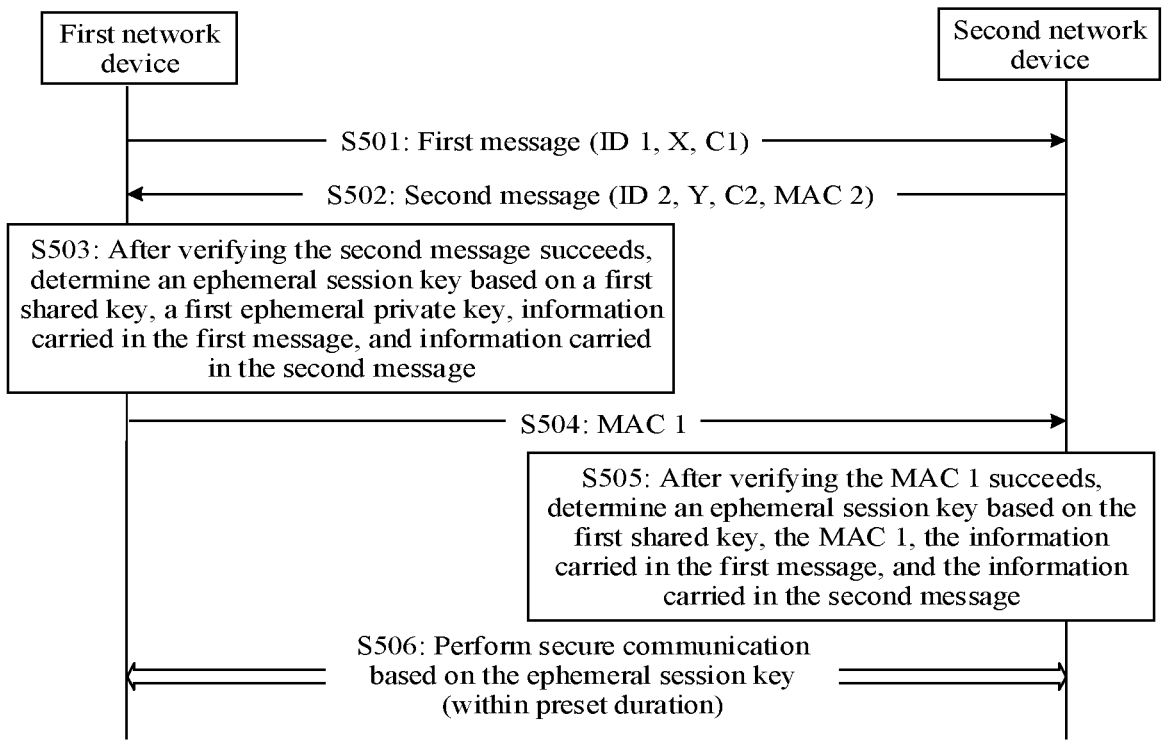
FIG. 5 is a schematic flowchart of a fourth secure communications method according to an embodiment of this disclosure.

As shown in FIG. 5, an embodiment of this disclosure provides a third secure communications method. The method may be applied to the communications system shown in FIG. 1A/FIG. 1B. The method includes the following steps.

S501: A first network device sends a first message to a second network device, where the first message carries a first ephemeral public key (X) and a first random number (Nonce 1, referred to as N1 in FIG. 5).

The first random number (Nonce 1) is used only once, and is used to uniquely identify that the first network device has sent the first message, so as to prevent the first message from being subjected to a replay attack.

Optionally, as shown in FIG. 5, the first network device may further add, to the first message, an ID used to identify the first network device, which is recorded as an ID 1, to explicitly indicate that the first message comes from the first network device.

S502: The second network device sends a second message to the first network device, where the second message carries a second ephemeral public key (Y), second verification information, and a second random number (Nonce 2, referred to as N2 in FIG. 5)

The second random number (Nonce 2) is used only once, and is used to uniquely identify that the second network device has sent the second message, so as to prevent the second message from being subjected to a replay attack.

Optionally, as shown in FIG. 5, the second network device may further add, to the second message, an ID used to identify the second network device, which is recorded as the ID 2, to explicitly indicate that the second message comes from the second network device.

Optionally, the second network device may determine the second verification information based on the second ephemeral public key and the first shared key. The second verification information is referred to as a MAC of the second message. As shown in FIG. 5, the second verification information is recorded as a MAC 2. In an optional implementation, the MAC 2 may be determined in the following manner. First, the second network device derives a key MacKey by using an HMAC algorithm, an HKDF algorithm, the foregoing first pre-shared key PSK, and encryption context (S∥"MacKey"). Further, MacKey=HKDF(PSK, S∥"MacKey"). The HKDF algorithm is an HMAC-based KDF, and the HMAC is a hash-based MAC. "∥" indicates a concatenated concatenation symbol. S is used to indicate information carried in the first message and the second message, and further, S=ID 1∥ID 2∥Nonce 1∥Nonce 2∥X∥Y. "MacKey" is a character string used to identify a derived MacKey, and may be a character string in which the first network device and the second network device negotiate a specific encoding rule in advance, or certainly may be replaced by another character string. This is not limited in the embodiment of this disclosure. Then, the second network device derives the second verification information MAC 2 by using the MAC algorithm, the MacKey, and encryption context (S). MAC 2=MAC (MacKey, S∥"2"). The MAC algorithm may be an HAMC algorithm, a CMAC algorithm, or the like. "2" is a character string used to identify that the second network device generates the MAC 2, or certainly may be replaced by another character string. This is not limited in the embodiment of this disclosure.

S503: The first network device verifies the second message, and determines an ephemeral session key based on the first shared key, a first ephemeral secret key, the information carried in the first message, and the information carried in the second message after the verification succeeds.

Optionally, that the first network device verifies the second message includes the following two steps S1 and S2. S1:

The first network device determines whether the second random number carried in the second message is received for the first time. If the second random number carried in the second message is received for the first time, S2 is performed. If the second random number carried in the second message is not received for the first time, the first network device determines that the verification fails. S2: The first network device parses out the second ephemeral public key (Y) and the second random number (N2) that are carried in the second message, calculates S=ID 1∥ID 2∥Nonce 1∥Nonce 2∥X∥Y in the same manner as that of the second network device, obtains S through calculation, and then calculates MacKey=HKDF(PSK, S∥"MacKey"), and the first network device verifies, based on the MacKey obtained by calculation, whether the MAC 2 carried in the second message is correct. If the MAC 2 carried in the second message is correct, the first network device determines that the verification succeeds. If the MAC 2 carried in the second message is not correct, the first network device determines that the verification fails.

After determining that the verification succeeds, the first network device may determine the ephemeral session key by using the following formulas. The ephemeral session key includes an encryption key (DataKey) used for transmitting data between the first network device and the second network device, and an authentication key (AuthKey) used by the first network device and the second network device to verify each other's identities.

DataKey=HKDF(masterKey, W∥"DataKeyInfo").
AuthKey=HKDF(masterKey, W1∥"AuthenticationKeyInfo").

W is used to represent the information carried in the first message and the second message. Further, W may be a hash value obtained by performing hash calculation on the information carried in the first message and the second message by using a hash (Hash) algorithm. For example, W=Hash (Nonce 1∥Nonce 2∥X∥Y∥ID 1∥ID 2∥MAC 1∥MAC 2).

Herein, masterKey indicates an ephemeral master key, which is used as a base key for deriving the DataKey or AuthKey. Optionally, masterKey may be calculated by using the following formula: masterKey=HKDF(PSK∥x*Y, W). x*Y represents point multiplication calculation according to the foregoing elliptic curve encryption algorithm, and x*Y=x*y*G=y*x*G=y*X.

"DataKeyInfo" includes information necessary to support lifecycle management of the encryption key, and is bound to the encryption key DataKey. "AuthenticationKeyInfo" includes information necessary to support lifecycle management of the authentication key, and is bound to the authentication key AuthKey.

Further, after successfully verifying the second message, the first network device performs S504 and S505.

S504: The first network device sends first verification information to the second network device.

Optionally, the first network device may determine the first verification information based on the first ephemeral public key and the first shared key. The first verification information is referred to as a MAC of the first message. As shown in FIG. 5, the first verification information is recorded as the MAC 1. In an optional implementation, the MAC 1 may be determined in the following manner. First, the first network device derives a key MacKey by using an HMAC algorithm, an HKDF algorithm, the foregoing first pre-shared key PSK, and encryption context (S∥"MacKey"). Further, MacKey=HKDF(PSK, S∥"MacKey"). The HKDF algorithm is an HMAC-based KDF, and the HMAC is a hash-based MAC. "∥" indicates a concatenated concatenation symbol. S is used to indicate information carried in the first message and the second message, and further, S=ID 1∥ID 2∥Nonce 1∥Nonce 2∥X∥Y. "MacKey" is a character string used to identify a derived MacKey, and may be a character string in which the first network device and the second network device negotiate a specific encoding rule in advance, or certainly may be replaced by another character string. This is not limited in the embodiment of this disclosure. Then, the first network device derives the first verification information MAC 1 by using the MAC algorithm, the MacKey, and the encryption context (S). MAC 1=MAC (MacKey, S∥"1"). The MAC algorithm may be an HAMC algorithm, a CMAC algorithm, or the like. "1" is a character string used to identify that the first network device generates the MAC 1, or certainly may be replaced by another character string. This is not limited in the embodiment of this disclosure.

S505: The second network device verifies the first verification information (MAC 1), and after the verification succeeds, determines an ephemeral session key based on the first shared key, the first verification information (MAC 1), the second ephemeral secret key, the information carried in the first message, and the information carried in the second message.

Optionally, the second network device may calculate S=ID 1∥ID 2∥Nonce 1∥Nonce 2∥X∥Y in the same manner as that of the first network device, obtain S through calculation, and then calculate MacKey=HKDF(PSK, S∥"MacKey"), and the first network device verifies, based on the MacKey obtained through calculation, whether the first verification information (MAC 1) is correct. If the first verification information (MAC 1) is correct, the second network device determines that the verification succeeds. If the first verification information (MAC 1) is not correct, the second network device determines that the verification fails.

After determining that the verification succeeds, the second network device determines the ephemeral session key with reference to the implementation in S503. Details are not described again in the embodiment of this disclosure.

Further, S506 is performed. The first network device and the second network device perform secure communication based on the ephemeral session key within preset duration.

In the embodiment of this disclosure, when interacting ephemeral public keys randomly generated by the two communication parties, the two communication parties interacts the random number and the MAC that can uniquely identify the message, to complete identity authentication of each other. This feature prevents interaction messages from being subjected to replay attacks, unknown key sharing attacks, and MITM attacks. In this way, security of message interaction, especially ephemeral public key interaction, is improved. Further, the ephemeral session key that is available for communication between the communication parties within a specific period of time is determined based on the shared key preconfigured on the communication parties and the ephemeral public keys generated by the communication parties. In this way, a session key leak and an ephemeral key leak can be prevented, and forward security can be ensured. Even if the foregoing ephemeral session key is subsequently leaked, previous communication content cannot be obtained due to expiration of the time limit. Therefore, security of communication between the first network device and the second network device is greatly improved.

In another possible implementation, both the first network device and the second network device support a SecOC protocol. Secure communication between the first network device and the second network device may be implemented based on the SecOC communication architecture shown in FIG. 6.

Figure 6:
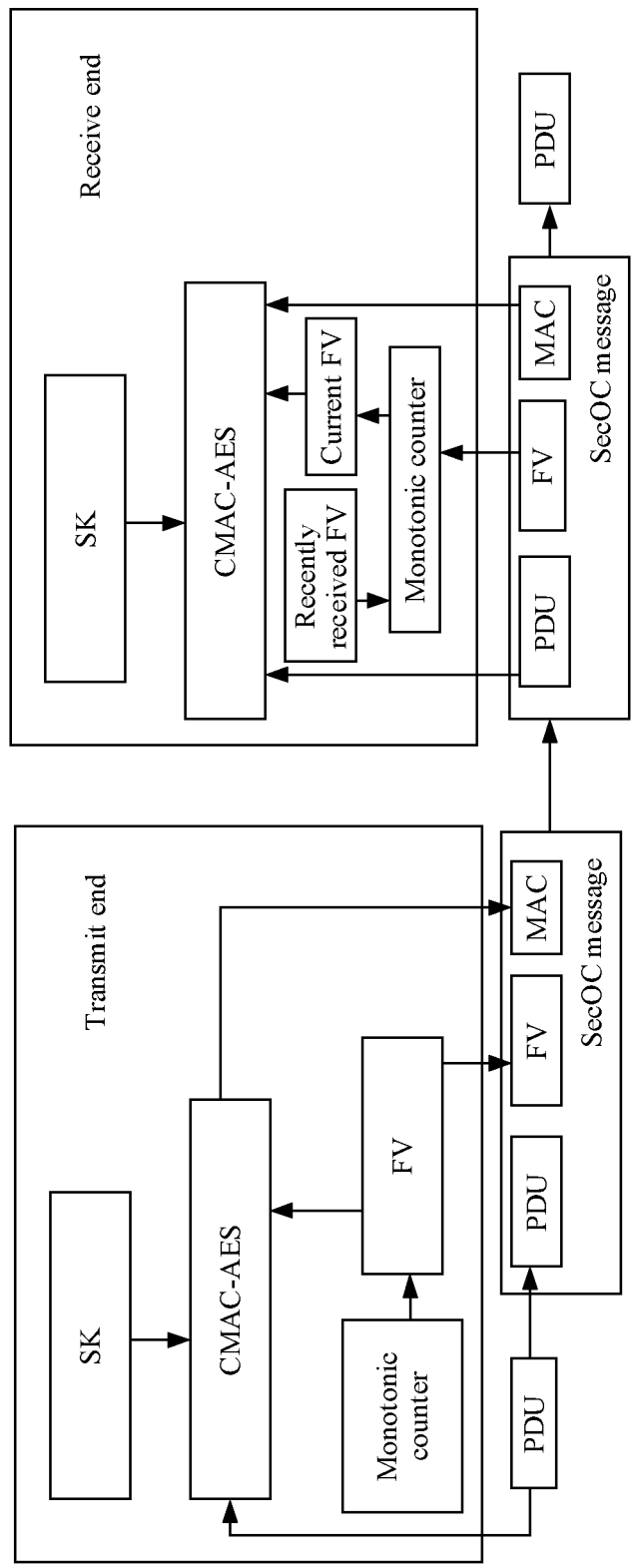
FIG. 6 is a schematic diagram of a security onboard communication (SecOC) communications architecture according to an embodiment of this disclosure.

For example, FIG. 6 further shows interaction between a transmit end and a receive end. In a manner, the first network device serves as the transmit end, and the second network device serves as the receive end. In another manner, the second network device serves as the transmit end, and the first network device serves as the receive end.

The transmit end generates a MAC (denoted as a MAC as shown in FIG. 6) of the to-be-sent SecOC message by using a CMAC-AES algorithm, a shared key SK defined in the SecOC protocol, a PDU packet, and a fresh value (FV) generated by a monotonic counter.

The transmit end sends the SecOC message to the receive end, where the SecOC message includes the PDU packet, the FV, and the MAC.

The receive end receives the SecOC message from the transmit end, and parses the PDU packet, the FV, and the first MAC in the SecOC message.

The receive end compares the recently received fresh value (for example, the FV in the SecOC message) with the current fresh value generated by the monotonic counter. After the recently received fresh value (for example, the FV in the SecOC message) is the same as the current fresh value generated by the monotonic counter, the MAC is verified based on the PDU in the SecOC message, the shared key SK defined in the SecOC protocol, and the CMAC-AES algorithm. If the verification succeeds, the SecOC message is authentic, complete, and valid.

Figure 7:
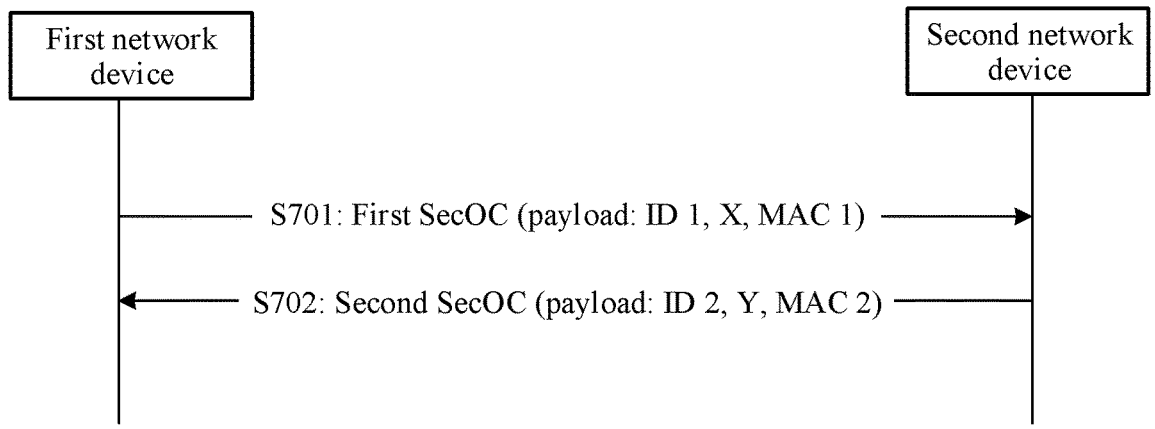
FIG. 7 is a schematic diagram of an interaction process of an ephemeral public key according to an embodiment of this disclosure.

Based on this SecOC communication architecture, FIG. 7 is a schematic diagram of an interaction process of an ephemeral public key. This embodiment of this disclosure further provides a process of interacting an ephemeral public key between a first network device and a second network device. The following steps are included.

S701: A first network device sends, to a second network device, a first message carrying a first ephemeral public key (X), where the first message may be further a first SecOC message, and the first ephemeral public key may be carried in a payload of the first SecOC message, for example, in a first protocol data unit (PDU) packet.

Optionally, the first network device may further include an ID 1 of the first network device in the payload of the first SecOC message.

As described in the foregoing embodiment, the first network device and the second network device are configured with a first pre-shared key PSK. Optionally, if the first pre-shared key PSK is different from a shared key SK defined in a SecOC protocol, the first network device may further add a MAC 1 to the payload of the first SecOC message, where the MAC 1 is used to verify whether the first PDU packet is complete. Optionally, the first network device may determine the MAC 1 by using the following formula: MAC 1=MAC(MacKey 1, X∥ID 1∥"ID 2"). The MacKey 1 may be determined with reference to the embodiment in S301*a*.

S702: The second network device sends a second message carrying a second ephemeral public key (Y) to the first network device, where the second message may be further a second SecOC message, and the second ephemeral public key may be carried in a payload of the second SecOC message, for example, in a second PDU packet.

Optionally, the second network device may further include an ID 2 of the second network device in the payload of the second SecOC message.

As described in the foregoing embodiment, the first network device and the second network device are configured with a first pre-shared key PSK. Optionally, if the first pre-shared key PSK is different from the shared key SK defined in the SecOC protocol, the second network device may further add a MAC 2 to the payload of the second SecOC message, where the MAC 2 is used to verify whether the second PDU packet is complete. Optionally, the first network device may determine the MAC 2 by using the following formula: MAC 2=MAC(MacKey 2, X∥ID 1∥ID 2). Herein, MacKey 2 may be determined with reference to the embodiment in S301*b*.

It should be noted that S701 and S702 may be simultaneously implemented. This is not limited in this embodiment of this disclosure.

Further, after S701 and S702, the first network device may further determine an ephemeral session key based on the first pre-shared key PSK, the first ephemeral secret key, the information carried in the first SecOC message, and the information carried in the second SecOC message. For a manner in which the first network device determines the ephemeral session key, refer to the embodiment in S302*a*. Details are not described again in this embodiment of this disclosure. Similarly, after S701 and S702, the second network device may further determine the ephemeral session key based on the first pre-shared key PSK, the second ephemeral secret key, the information carried in the first SecOC message, and the information carried in the second SecOC message. For a manner in which the second network device determines the ephemeral session key, refer to the embodiment in S302*b*. Details are not described again in this embodiment of this disclosure.

Figure 8:
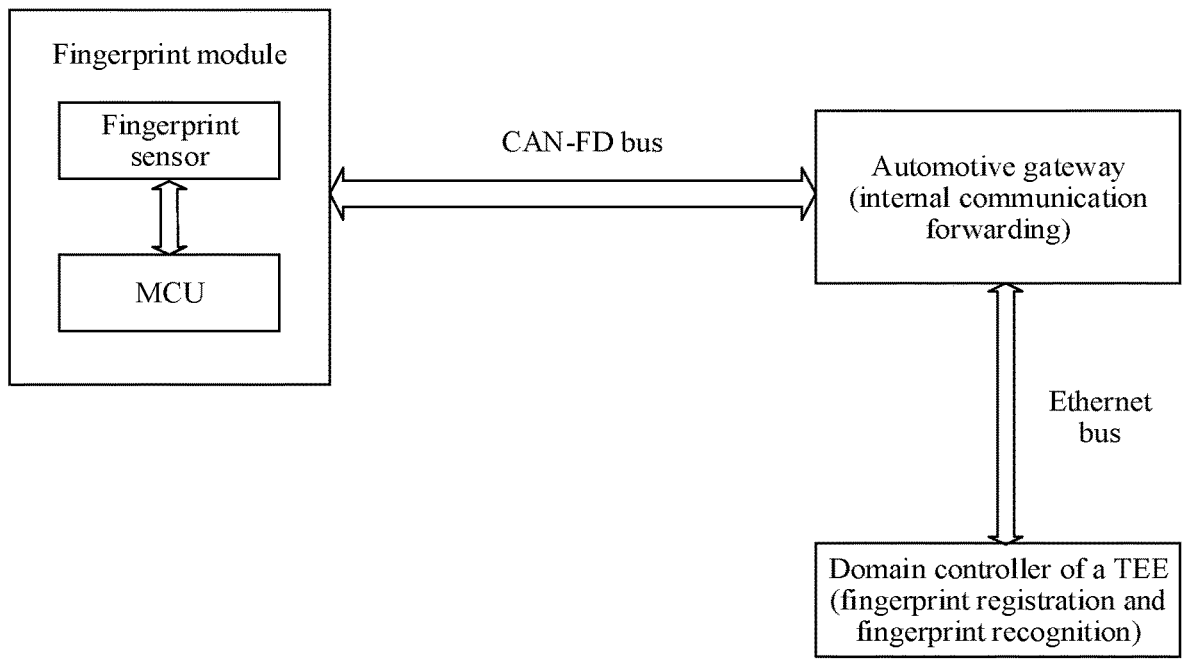
FIG. 8 is a schematic diagram of interaction between in-vehicle network elements according to an embodiment of this disclosure.

Based on the foregoing embodiments, an embodiment of this disclosure further provides an application scenario of the foregoing secure communications method. FIG. 8 is a schematic diagram of interaction between in-vehicle network elements. FIG. 8 shows a fingerprint module, an in-vehicle gateway, and a domain controller of a trusted execution environment (TEE). The fingerprint module is connected to the in-vehicle gateway by using a CAN/CAN-FD bus, and the in-vehicle gateway communicates with the domain controller of the TEE by using an Ethernet bus. In an application scenario, fingerprint information collected on the fingerprint module needs to be transmitted to the in-vehicle gateway by using the CAN/CAN-FD bus. Then, the in-vehicle gateway performs cross-domain internal forwarding, that is, communicates with the domain controller of the TEE by using the Ethernet bus, to transmit the fingerprint information to the domain controller of the TEE. Further, the domain controller of the TEE performs processing such as fingerprint registration and fingerprint recognition according to the fingerprint information. In this scenario, the fingerprint module communicates with the domain controller of the TEE across domains, and an ephemeral session key available for communication between the two parties may be determined according to the foregoing secure communications method. For example, the fingerprint module is used as the first network device, and the domain controller of the TEE is used as the second network device. Mutual authentication between the fingerprint module and the domain controller of the TEE within preset duration is completed through the ephemeral session key, and fingerprint information is encrypted for transmission. End-to-end secure communication is implemented between the fingerprint module and the domain controller of the TEE, so that the fingerprint information can be prevented from being leaked and tampered during transmission. Secure communication of fingerprint data is ensured.

Optionally, FIG. 8 further shows a structure of a fingerprint module. The fingerprint module includes a fingerprint sensor and a microcontroller unit (MCU).

Figure 9:
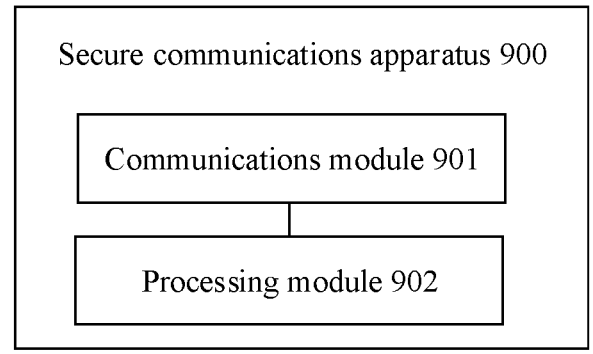
FIG. 9 is a block diagram of a structure of a data transmission apparatus according to an embodiment of this disclosure.

Based on a same concept, refer to FIG. 9. An embodiment of this disclosure provides a secure communications apparatus 900. The apparatus 900 includes a communications module 901 and a processing module 902. Optionally, the communications module 901 may be implemented by using a transceiver. Alternatively, the communications module 901 may include a receiving module and a sending module. The receiving module may be implemented by using a receiver, and the sending module may be implemented by using a transmitter. The processing module 902 may be implemented by using a processor. The processor may be a general purpose processor, an application-specific integrated circuit, or the like. This is not limited in this embodiment of this disclosure.

(1) The secure communications apparatus 900 may be applied to a first network device. Further, the secure communications apparatus 900 may be a first network device, or may be an apparatus applied to the first network device, or may be an apparatus capable of supporting the first network device in performing a secure communications method. The following describes in detail functions or execution processes of modules in the secure communications apparatus 900 for the first network device.

The communications module 901 is configured to receive a second ephemeral public key of a second network device.

The processing module 902 is configured to determine an ephemeral session key based on a first shared key, a first ephemeral secret key of the first network device, and the second ephemeral public key, where the first shared key is a key shared between the first network device and the second network device.

The communications module 901 is further configured to perform secure communication with the second network device based on the ephemeral session key.

In this embodiment of this disclosure, the communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the processing module 902 is further configured to obtain a first ephemeral public key through derivation based on a public key cryptographic algorithm and the first ephemeral secret key, where a same public key cryptographic algorithm is configured in the first network device and the second network device, and the communications module 901 is further configured to send a first message to the second network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the processing module 902 is further configured to determine the first verification information based on the first ephemeral public key and the first shared key.

In an optional implementation, the first identification information includes a first timestamp, a first count, or a first random number.

In an optional implementation, the communications module 901 is further configured to receive a second message from the second network device, where the second message carries the second ephemeral public key.

In an optional implementation, the second message further carries second verification information used to verify whether the second message is complete and/or second identification information used to indicate that the second network device has sent the second message. When the second ephemeral public key is transferred through the second message, application layer session authentication of the second network device on the first network device may be completed.

In an optional implementation, the second identification information includes a second timestamp, a second count, or a second random number.

In an optional implementation, the processing module 902 is further configured to encrypt, by using a preset key derivation function, the first shared key, the first ephemeral key, the information carried in the first message, and the information carried in the second message, to generate the ephemeral session key, where a same key derivation function is configured in the first network device and the second network device.

(2) The secure communications apparatus 900 may be applied to the second network device. Further, the secure communications apparatus 900 may be the second network device, or may be an apparatus applied to the second network device, or may be an apparatus capable of supporting the second network device in performing the secure communications method. The following describes in detail functions or execution processes of modules in the secure communications apparatus 900 for the second network device.

The communications module 901 is configured to receive a first ephemeral public key of a first network device.

The processing module 902 is configured to determine an ephemeral session key based on a first shared key, a second ephemeral secret key of the second network device, and the first ephemeral public key, where the first shared key is a key shared between the first network device and the second network device.

The communications module 901 is further configured to perform secure communication with the first network device based on the ephemeral session key.

In this embodiment of this disclosure, the communication parties negotiate the ephemeral session key based on a pre-shared key, the ephemeral secret keys of the communication parties, and the ephemeral public keys of the parties, and it is set that the communication parties use the ephemeral session key to perform communication within valid duration of the ephemeral session key, so that communication security can be improved.

In an optional implementation, the communications module is further configured to receive a first message from the first network device, where the first message carries the first ephemeral public key.

In an optional implementation, the first message further carries first verification information used to verify whether the first message is complete and/or first identification information used to indicate that the first network device has sent the first message. When the first ephemeral public key is transferred through the first message, application layer session authentication of the first network device on the second network device may be completed.

In an optional implementation, the first identification information includes a first timestamp, a first count, or a first random number.

In an optional implementation, the processing module 902 is further configured to obtain a second ephemeral public key through derivation based on a public key cryptographic algorithm and the second ephemeral secret key, where a same public key cryptographic algorithm is configured in the first network device and the second network device, and the communications module 901 is further configured to send a second message to the first network device, where the second message carries the second ephemeral public key.

In an optional implementation, the second message further carries second verification information used to verify whether the second message is complete and/or second identification information used to indicate that the second message has been sent. When the second ephemeral public key is transferred through the second message, application layer session authentication of the second network device on the first network device may be completed.

In an optional implementation, the processing module 902 is further configured to determine the second verification information based on the second ephemeral public key and the shared key.

In an optional implementation, the second identification information includes a second timestamp, a second count, or a second random number.

In an optional implementation, the processing module 902 is further configured to encrypt, by using a preset key derivation function, the first shared key, the second ephemeral secret key, the information carried in the first message, and the information carried in the second message, to generate the ephemeral session key, where a same key derivation function is configured in the first network device and the second network device.

Figure 10:
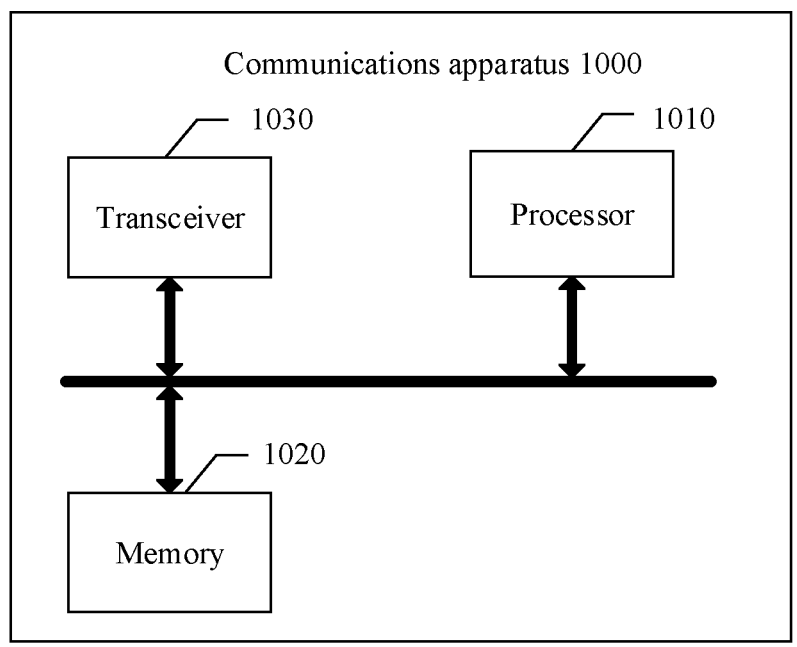
FIG. 10 is a schematic diagram of a structure of a communications apparatus according to an embodiment of this disclosure.

Based on a same concept, as shown in FIG. 10, an embodiment of this disclosure provides a communications apparatus 1000. For example, the communications apparatus 1000 may be a chip or a chip system. Optionally, in this embodiment of this disclosure, the chip system may include a chip, or may include a chip and another discrete component.

The communications apparatus 1000 may include at least one processor 1010. The communications apparatus 1000 may further include at least one memory 1020 configured to store a computer program, a program instruction, and/or data. The memory 1020 is coupled to the processor 1010.

The coupling in this embodiment of this disclosure is indirect coupling or a communication connection between apparatuses, units, or modules for information interaction between the apparatuses, the units, or the modules, and may be in electrical, mechanical, or other forms. The processor 1010 may cooperate with the memory 1020. The memory 1020 stores a computer program, a program instruction, and/or data necessary for implementing any one of the foregoing embodiments. The processor 1010 may execute the computer program stored in the memory 1020, to complete the method in any one of the foregoing embodiments. Optionally, at least one of the at least one memory 1020 may be included in the processor 1010.

The communications apparatus 1000 may further include a transceiver 1030, and the communications apparatus 1000 may interact information with another device by using the transceiver 1030. The transceiver 1030 may be a circuit, a bus, a transceiver, or any other apparatus that may be configured to interact information.

In a possible implementation, the communications apparatus 1000 may be applied to a first network device. Further, the communications apparatus 1000 may be the first network device, or may be an apparatus that can support the first network device to implement a function of the first network device in any one of the foregoing embodiments. The memory 1020 stores a necessary computer program, a program instruction, and/or data for implementing the function of the first network device in any one of the foregoing embodiments. The processor 1010 may execute the computer program stored in the memory 1020, to complete the method performed by the first network device in any one of the foregoing embodiments.

In another possible implementation, the communications apparatus 1000 may be applied to a second network device. Further, the communications apparatus 1000 may be the second network device, or may be an apparatus that can support the second network device to implement a function of the second network device in any one of the foregoing embodiments. The memory 1020 stores a necessary computer program, a program instruction, and/or data for implementing the function of the second network device in any one of the foregoing embodiments. The processor 1010 may execute the computer program stored in the memory 1020, to complete the method performed by the second network device in any one of the foregoing embodiments.

In this embodiment of this disclosure, a specific connection medium among the transceiver 1030, the processor 1010, and the memory 1020 is not limited. In this embodiment of this disclosure, the memory 1020, the processor 1010, and the transceiver 1030 are connected by using a bus in FIG. 10. The bus is represented by using a bold line in FIG. 10. A connection manner between other components is merely an example for description, and is not limited thereto. Buses may be classified into an address bus, a data bus, a control bus, and the like. For ease of representation, only one thick line is used to represent the bus in FIG. 10, but this does not mean that there is only one bus or only one type of bus.

In the embodiment of this disclosure, the processor may be a general-purpose processor, a digital signal processor, an application-specific integrated circuit, a field programmable gate array or another programmable logic device, a discrete gate or transistor logic device, or a discrete hardware component, and may implement or the methods, steps, and logical block diagrams disclosed in the embodiments of this disclosure. The general-purpose processor may be a microprocessor, any conventional processor, or the like. The steps of the methods disclosed with reference to the embodiments of this disclosure may be directly performed and accomplished by using a hardware processor, or may be performed and accomplished by using a combination of hardware and software modules in the processor.

In the embodiments of this disclosure, the memory may be a nonvolatile memory, such as a hard disk drive (HDD) or a solid-state drive (SSD), or may be a volatile memory, such as a random-access memory (RAM). The memory may be alternatively any other medium that can be used to carry or store desired program code in a form of an instruction or a data structure and that can be accessed by a computer, but is not limited thereto. The memory in the embodiment of this disclosure may alternatively be a circuit or any other apparatus that can implement a storage function, and is configured to store the computer program, the program instruction, and/or the data.

Figure 11:
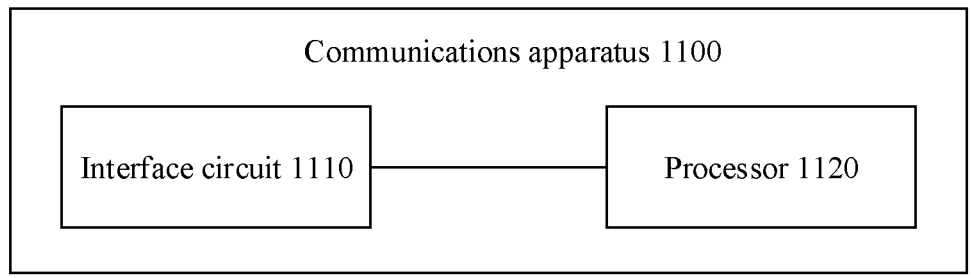
FIG. 11 is a schematic diagram of a structure of a communications apparatus according to an embodiment of this disclosure.

Based on the foregoing embodiment, refer to FIG. 11. An embodiment of this disclosure further provides another communications apparatus 1100, including an interface circuit 1110 and a processor 1120. The interface circuit 1110 is configured to receive code instructions and transmit the code instructions to the processor. The processor 1120 is configured to run the code instructions to perform the method performed by the first network device or the method performed by the second network device in any one of the foregoing embodiments.

Based on the foregoing embodiments, the embodiments of this disclosure further provide a computer-readable storage medium. The computer-readable storage medium stores instructions. When the instructions are executed, a method performed by the first network device or a method performed by the second network device in any one of the foregoing embodiments is implemented. The computer-readable storage medium may include any medium that can store program code, such as a Universal Serial Bus (USB) flash drive, a removable hard disk, a read-only memory (ROM), a RAM, a magnetic disk, or an optical disc.

To implement functions of the communications apparatus in FIG. 9 to FIG. 11, an embodiment of this disclosure further provides a chip, including a processor configured to support the communications apparatus in implementing functions related to the first network device or the second network device in the foregoing method embodiments. In a possible design, the chip is connected to a memory or the chip includes a memory, and the memory is configured to store program instructions and data that are necessary for the communications apparatus.

Persons skilled in the art should understand that the embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a magnetic disk memory, a compact disc (CD) ROM (CD-ROM), an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

Definitely, a person skilled in the art can make various modifications and variations to the embodiments of this disclosure without departing from the scope of the embodiments of this disclosure. In this way, this disclosure is intended to cover these modifications and variations of the embodiments of this disclosure provided that they fall within the scope of protection defined by the following claims and their equivalent technologies.

What is claimed is:

1. A method implemented by a first network device, wherein the method comprises:
   receiving a second ephemeral public key of a second network device;
   determining an ephemeral session key based on a shared key between the first network device and the second network device, an ephemeral secret key of the first network device, and the second ephemeral public key, wherein the shared key is preconfigured between the first network device and the second network device;
   obtaining, based on the ephemeral secret key, a first ephemeral public key;
   obtaining first verification information based on the first ephemeral public key, the shared key, and a key derivation function (KDF) algorithm, wherein the KDF algorithm comprises a keyed-hash MAC (HMAC) algorithm or a Hash-based Key Derivation Function (HKDF);
   performing, based on the ephemeral session key, a secure communication with the second network device; and
   sending, to the second network device and using the secure communication, a first message carrying the first ephemeral public key, the first verification information, and a first timestamp identifying a time at which the first network device has sent the first message.

2. The method of claim 1, further comprising further obtaining, based on a public key cryptographic algorithm, the first ephemeral public key, wherein the public key cryptographic algorithm is pre-configured in the first network device and the second network device.

3. The method of claim 1, wherein the first verification information verifies whether the first message is complete, and wherein the first message further carries first identification information indicating that the first network device has sent the first message.

4. The method of claim 1, further comprising generating a message authentication code (MAC) by applying a message authentication algorithm to the first verification information, wherein the first message further carries the MAC.

5. The method of claim 1, further comprising receiving, from the second network device, a second message carrying the second ephemeral public key.

6. The method of claim 5, wherein the second message further carries either second verification information verifying whether the second message is complete or second identification information indicating that the second network device has sent the second message.

7. The method of claim 5, wherein determining the ephemeral session key comprises encrypting, using a preset key derivation function, the shared key, the ephemeral secret key, the second ephemeral public key, first information carried in the first message, and second information carried in the second message, to generate the ephemeral session key, wherein the preset key derivation function is configured in the first network device and the second network device.

8. A first network device comprising:
a non-transitory computer-readable storage medium configured to store instructions; and
a processor coupled to the non-transitory computer-readable storage medium, wherein the instructions cause the processor to be configured to:
receive a second ephemeral public key of a second network device; and
determine an ephemeral session key based on a shared key between the first network device and the second network device, an ephemeral secret key of the first network device, and the second ephemeral public key, wherein the shared key is preconfigured between the first network device and the second network device;
obtain, based on the ephemeral secret key, a first ephemeral public key;
obtain first verification information based on the first ephemeral public key, the shared key, and a key derivation function (KDF) algorithm, wherein the KDF algorithm comprises a keyed-hash MAC (HMAC) algorithm or a Hash-based Key Derivation Function (HKDF);
perform, based on the ephemeral session key, a secure communication with the second network device; and
send, to the second network device and using the secure communication, a first message carrying the first ephemeral public key, the first verification information, and a first timestamp identifying a time at which the first network device has sent the first message.

9. The first network device of claim 8, wherein the instructions further cause the processor to be configured to further obtain, based on a public key cryptographic algorithm, the first ephemeral public key, wherein the public key pre-cryptographic algorithm is configured in the first network device and the second network device.

10. The first network device of claim 8, wherein the first verification information verifies whether the first message is complete, and wherein the first message further carries first identification information indicating that the first network device has sent the first message.

11. The first network device of claim 10, wherein the instructions further cause the processor to be configured to further generate a message authentication code (MAC) by applying a message authentication algorithm to the first verification information, and wherein the first message further carries the MAC.

12. The first network device of claim 8, wherein the programming instructions further cause the processor to receive, from the second network device, a second message carrying the second ephemeral public key.

13. The first network device of claim 12, wherein the second message further carries second verification information verifying whether the second message is complete or second identification information indicating that the second network device has sent the second message.

14. The first network device of claim 12, wherein the programming instructions further cause the processor to be configured to encrypt, using a preset key derivation function, the shared key, the ephemeral secret key, the second ephemeral public key, first information carried in the first message, and second information carried in the second message, to generate the ephemeral session key, and wherein the preset key derivation function is configured in the first network device and the second network device.

15. A computer program product comprising computer-executable instructions that are stored on a non-transitory computer-readable storage medium and that, when executed by a processor, cause a first network device to:
receive a second ephemeral public key of a second network device;
determine an ephemeral session key based on a shared key between the first network device and the second network device, an ephemeral secret key of the first network device, and the second ephemeral public key, wherein the shared key is preconfigured between the first network device and the second network device;
obtain, based on the ephemeral secret key, a first ephemeral public key;
obtain first verification information based on the first ephemeral public key, the shared key, and a key derivation function (KDF) algorithm, wherein the KDF algorithm comprises a keyed-hash MAC (HMAC) algorithm or a Hash-based Key Derivation Function (HKDF);
perform, based on the ephemeral session key, a secure communication with the second network device; and
send, to the second network device and using the secure communication, a first message carrying the first ephemeral public key, the first verification information, and a first timestamp identifying a time at which the first network device has sent the first message.

16. The computer program product of claim 15, wherein the computer-executable instructions further cause the first network device to further obtain, based on a public key cryptographic algorithm, the first ephemeral public key, wherein the public key cryptographic algorithm is preconfigured in the first network device and the second network device.

17. The computer program product of claim 15, wherein the first verification information verifies whether the first message is complete, and wherein the first message further carries first identification information indicating that the first network device has sent the first message.

18. The computer program product of claim 15, wherein the computer-executable instructions further cause the first network device to receive, from the second network device, a second message carrying the second ephemeral public key.

19. The computer program product of claim 18, wherein the second message further carries second verification information verifying whether the second message is complete or second identification information indicating that the second network device has sent the second message.

20. The computer program product of claim 18, wherein the computer-executable instructions further cause the first network device to encrypt, using a preset key derivation function, the shared key, the ephemeral secret key, the second ephemeral public key, first information carried in the first message, and second information carried in the second message, to generate the ephemeral session key, and wherein the preset key derivation function is configured in the first network device and the second network device.

* * * * *